US008386179B2

(12) United States Patent
MacDonald

(10) Patent No.: US 8,386,179 B2
(45) Date of Patent: Feb. 26, 2013

(54) SOLAR ACCESS MEASUREMENT DEVICE

(75) Inventor: Willard S. MacDonald, Bolinas, CA (US)

(73) Assignee: Solmetric Corp., Sebastopol, CA (US)

( * ) Notice: Subject to any disclaimer, the term of this patent is extended or adjusted under 35 U.S.C. 154(b) by 80 days.

(21) Appl. No.: 12/952,101

(22) Filed: Nov. 22, 2010

(65) Prior Publication Data

US 2011/0134268 A1 Jun. 9, 2011

Related U.S. Application Data

(63) Continuation of application No. 11/321,294, filed on Dec. 28, 2005, now Pat. No. 7,873,490.

(51) Int. Cl.
*G01C 11/04* (2006.01)
*G01J 1/00* (2006.01)
*G01W 1/00* (2006.01)
*G06F 19/00* (2011.01)

(52) U.S. Cl. ......... 702/3; 73/170.27; 250/215; 356/213; 356/218; 382/173; 382/174; 702/189; 708/200

(58) Field of Classification Search .................. 126/569, 126/572, 573, 574, 578, 600, 601; 244/158.1, 244/172.7, 172.8; 250/200, 201.1, 203.1, 250/203.3, 203.4, 203.6, 215; 356/138, 139.01, 356/139.03, 139.04, 213, 218; 382/100, 382/103, 173, 174; 702/1, 2, 3, 5, 127, 150, 702/151, 152, 153, 154, 187, 189; 708/100, 708/105, 200; 73/170.16, 170.27
See application file for complete search history.

(56) References Cited

U.S. PATENT DOCUMENTS

| | | | | |
|---|---|---|---|---|
| 3,305,686 A * | 2/1967 | Carter et al. | ............... | 250/203.4 |
| 3,390,576 A * | 7/1968 | Yellott | ........................ | 73/170.27 |
| 4,177,566 A * | 12/1979 | Haines | ........................ | 33/1 DD |
| 4,288,922 A * | 9/1981 | Lewis | ........................ | 33/1 DD |
| 4,430,000 A * | 2/1984 | Eldering et al. | ............... | 356/236 |
| 4,445,030 A * | 4/1984 | Carlton | ........................ | 250/203.4 |
| 4,588,295 A * | 5/1986 | Eldering et al. | ............... | 356/300 |
| 5,317,145 A * | 5/1994 | Corio | ........................ | 250/203.4 |
| 5,808,583 A * | 9/1998 | Roberts | ........................ | 342/359 |
| 5,838,330 A * | 11/1998 | Ajima | ........................ | 345/427 |
| 6,680,693 B2 * | 1/2004 | Urban et al. | ............... | 342/357.64 |
| 7,516,557 B2 * | 4/2009 | Courter | ........................ | 33/270 |
| 7,690,123 B2 * | 4/2010 | MacDonald | ........................ | 33/268 |
| 7,861,422 B2 * | 1/2011 | MacDonald | ........................ | 33/268 |
| 7,873,490 B2 * | 1/2011 | MacDonald | ........................ | 702/127 |
| 2003/0169200 A1 * | 9/2003 | Urban et al. | ............... | 342/357.06 |
| 2007/0150198 A1 * | 6/2007 | MacDonald | ........................ | 702/2 |
| 2007/0214665 A1 * | 9/2007 | Courter | ........................ | 33/270 |
| 2009/0049702 A1 * | 2/2009 | MacDonald | ........................ | 33/268 |
| 2010/0061593 A1 * | 3/2010 | MacDonald et al. | ......... | 382/103 |
| 2010/0139105 A1 * | 6/2010 | MacDonald | ........................ | 33/268 |
| 2010/0302363 A1 * | 12/2010 | Mackenzie | ........................ | 348/135 |
| 2012/0121125 A1 * | 5/2012 | Dimov | ........................ | 382/103 |

OTHER PUBLICATIONS

Dennis; "An Automated Solar Shading Calculator", Proceedings of Australian and New Zealand Solar Energy Society; 2002, pp. 1-6.*

* cited by examiner

*Primary Examiner* — Edward Cosimano
(74) *Attorney, Agent, or Firm* — Coastal Patent Agency

(57) ABSTRACT

A Solar Access Measurement Device ("SAMD") located at a predetermined position is disclosed. The SAMD may include a skyline detector enabled to detect a skyline of a horizon relative to the SAMD, an orientation determination unit enabled to determine the orientation of the skyline detector, and a processor in signal communication with the skyline detector and orientation determination unit.

20 Claims, 8 Drawing Sheets

SOLAR ACCESS MEASUREMENT DEVICE

REFERENCE TO EARLIER-FILED APPLICATION

This application is a continuation of Non-Provisional patent application Ser. No. 11/321,294, filed on Dec. 28, 2005, and entitled "SOLAR ACCESS MEASUREMENT DEVICE," now U.S. Pat. No. 7,873,490, issued Jan. 18, 2011, which application is incorporated herein by this reference.

BACKGROUND OF THE INVENTION

1. Field of the Invention

This invention relates to solar measurement equipment, and in particular to measurement equipment capable of measuring solar access.

2. Related Art

With the advent of the modern industrialized society, there is a constant need for energy to power the growing energy consumption needs of the society. At present, fossil fuels are the main source of this energy but factors such as fossil fuel deposit scarcity, resultant pollution from burning fossil fuels, and geopolitical factors that affect the price and availability of fossil fuels have resulted in a need for alternative sources of energy. An example of a popular form of alternative energy source is solar energy.

In order to utilize solar energy, solar energy systems have been created and designed to harness received solar radiation into thermal or electrical energy through various means. These solar energy systems typically include a solar energy collector to collect the solar radiation and other components that convert the collected solar radiation into either electrical or thermal energy.

These solar energy systems need to be designed and installed in locations and orientations with the highest solar radiation exposure in order to maximize the amount of solar radiation that may be collected by the solar energy systems. As a result, there is a need to measure the solar radiation access at a given location and orientation.

There exist a number of known systems for measuring solar radiation. However, some of these systems are non-electronic devices that have limitations in their ease of use and accuracy because some utilize chemical processes of film exposure to store captured images that may not be analyzed until the film is developed, and most have alignment problems that make it difficult to make accurate measurements. The known electronic devices typically have limitations that include the lack of image calibration, the need to determine coordinates that uniquely identify the location of the device on the earth or region, the need to be left on-site for a long period of time, an inability to identify the skyline and open sky, and/or an inability to account for shading.

Therefore, there is a need for a new solar radiation measurement system that is capable of determining the solar radiation access at a given location and orientation without having the limitations associated with the existing known solar radiation measurement systems.

SUMMARY

A Solar Access Measurement Device ("SAMD") located at a predetermined position is disclosed. The SAMD may include a skyline detector enabled to detect a skyline of a horizon relative to the SAMD, an orientation determination unit enabled to determine the orientation of the skyline detector, and a processor in signal communication with the skyline detector and orientation determination unit. The processor may be enabled to determine the solar access of the predetermined location by calculating the position of the sun at different times of the day and year relative to the skyline.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

A Solar Access Measurement Device ("SAMD") is disclosed. The SAMD may be utilized as a "solar mapper" that is useful in the design and installation of solar energy systems and a variety of other situations where solar radiation exposure needs to be measured, such as landscaping, architecture, ecological studies, fisheries, forestry, golf course management, realtors/appraisers, universities/technical schools, utility companies, etc. In general operation, the SAMD may capture a digital image with a wide angle lens of a skyline and measure the magnetic orientation and inclination of the image. The SAMD may then process the image to locate the skyline in the image and then predict the paths of the sun throughout the day and year for the particular latitude of the SAMD. The SAMD may then determine the amount of annual solar radiation that will impinge the location of the SAMD.

Figure 1:
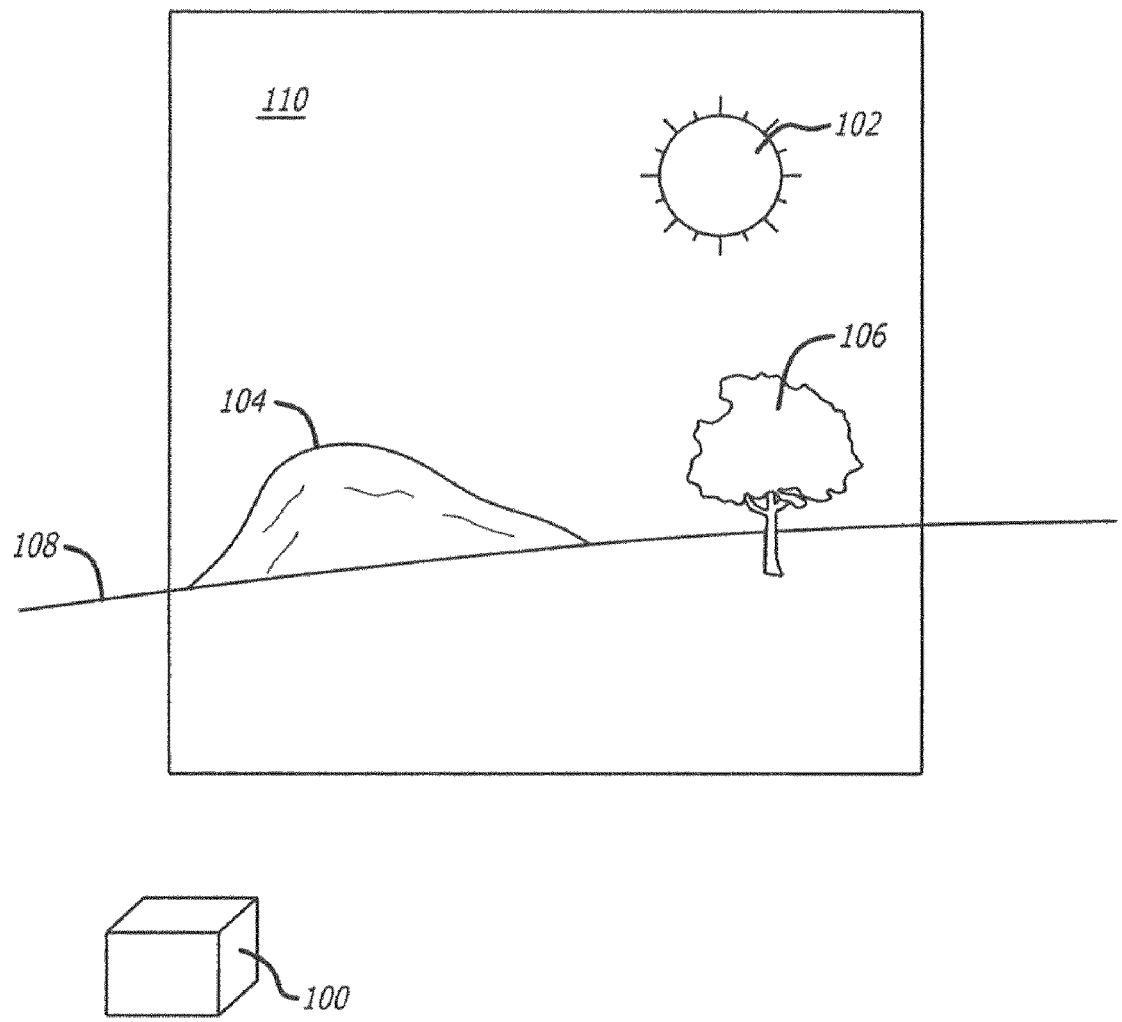
FIG. 1 is an example of an implementation of the Solar Access Measurement Device ("SAMD") in relation to open area and the sun.

In FIG. 1, an example of an implementation of the SAMD 100 is shown in relation to an open area and the sun 102. The open area may include solar obstacles such as, for example, a mountain 104, tree 106, hill, building, or other type of structure (not shown). The open area may also include the skyline 108 that is the line along which the surface of the earth, or solar obstacles, and the sky appear to meet in the horizon 110 relative to the SAMD 100. In general, the skyline 108 is the boundary between the open unobstructed sky and any earth-hound objects and includes all obstacles that will block the sun 102 at different times of the day and year, such as trees, buildings and mountains. In operation, the SAMD 100 captures an image of the horizon 110 and utilizes the captured image of the horizon 110 to determine the solar radiation exposure at the location of the SAMD 100.

Figure 2:
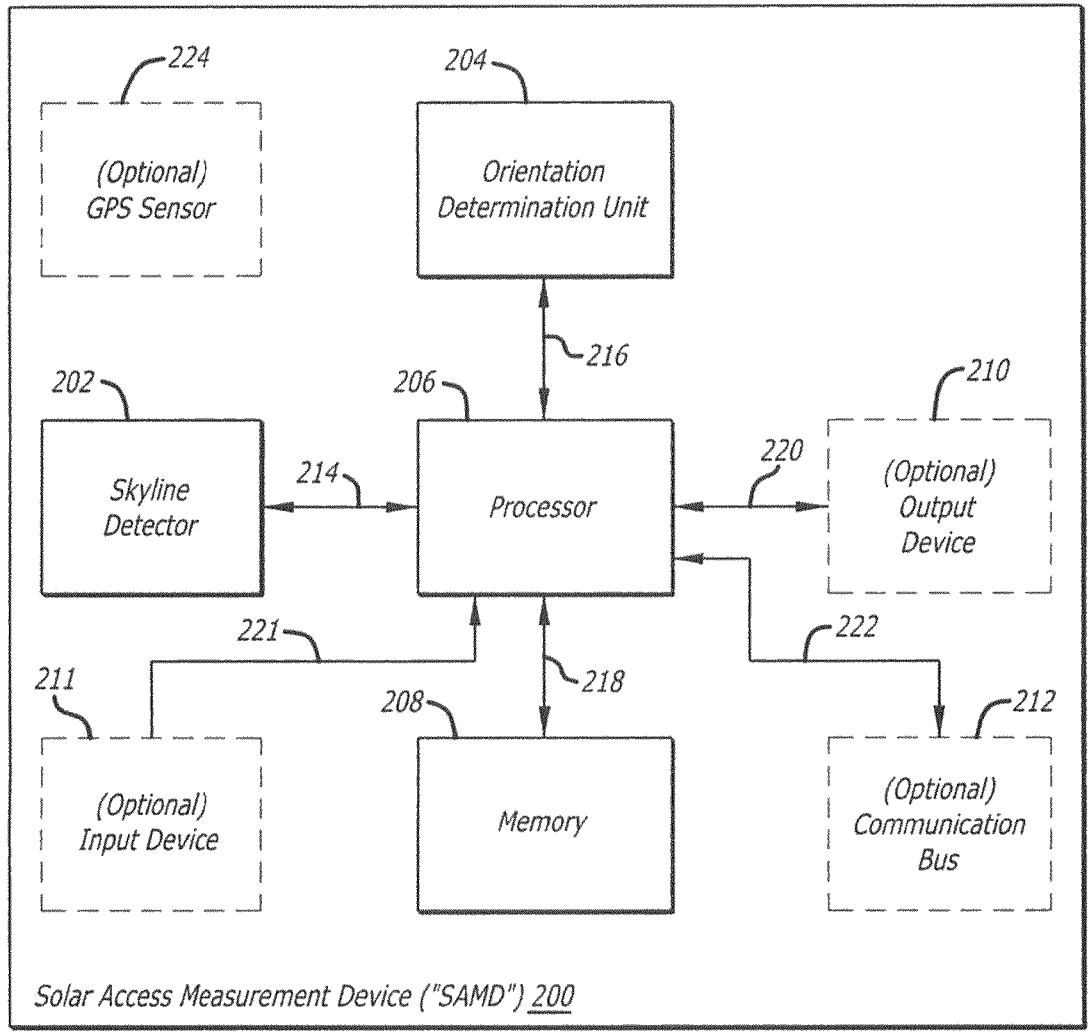
FIG. 2 is a block diagram of an example of an implementation of the SAMD.

In FIG. 2, a block diagram of an example of an implementation of the SAMD 200 is shown. The SAMD 200 may include a skyline detector 202, orientation determination unit 204, processor 206, memory 208, optional output device 210, optional input device 211, and optional communication bus 212. The processor 206 may be in signal communication with the skyline detector 202, orientation determination unit 204, memory 208, optional output device 210, optional input device 211 and optional communication bus 212 via signal paths 214, 216, 218, 220, 221 and 222, respectively. The SAMD 200 may also include a GPS sensor 224.

The skyline detector 202 is a device capable of detecting the skyline of the horizon relative to the SAMD 200. The skyline detector 202 may be implemented in various configurations utilizing different components.

As an example, the skyline detector 202 may include a calibrated image sensor (such as, for example, a calibrated electronic camera) having a sensor array and equipped with an ultra-wide angle fixed focal length lens such as a "fisheye" lens (not shown). The lens allows the image sensor to capture an image of the surrounding structures, trees and other obstructions in a semi-spherical range of 180 degrees in elevation (i.e., the vertical direction) and 360 degrees in azimuth (i.e., the horizontal direction) in relation to the SAMD 200. An ultra-wide angle lens may also be utilized that has less than 180 degrees degree field of view ("FOV"). In this example some of the relevant skyline may not be captured, and a small error in the solar access calculations may result. However, an advantage of using a lens with less than 180 degrees field of view is that they are typically less expensive. The skyline detector 202 may further include a processor (not shown) and software (not shown) capable of analyzing the captured image and locating the skyline in the captured image. It is appreciated by those skilled in the art that the processor (not shown) in the skyline detector 202 and the processor 206 may be the same processor or separate processors based on design preference for the SAMD 200.

In an example of operation, the image sensor of the skyline detector 202 may be pointed vertically at the sky, or alternatively in the southern direction (if the SAMD 200 is located in the northern hemisphere) or in the northern direction (if the SAMD 200 is located in the southern hemisphere), and held level until the image is captured. In general, the image sensor may be mounted to an enclosure (not shown) of the SAMD 200 that defines a predetermined pointing direction of the image sensor such that while the enclosure is held level, the image sensor may be pointing straight up or at another predetermined inclination relative to the enclosure. When the image sensor is oriented vertically and the lens has 180 degrees field of view, the resultant captured image by the image sensor will incorporate the entire sky and skyline through which all possible locations of the sun will occur throughout the day and year if the lens has less than 180 degrees FOV or the image sensor is oriented in a direction other than vertically, some of the relevant skyline may not be captured and a small error in the solar access calculations may result. However, an advantage of orienting the image sensor, for example, towards the south (in the northern hemisphere), is that the portion of the sky through which the "hottest" sun (i.e., the summer and midday sun) passes is more towards the center of the lens and image sensor. This is useful since ultra-wide angle lenses typically compress the image around the periphery of the image and provide more detail towards the center. More detail in the hottest region of the sky may lead to a more accurate determination of the location of the skyline in that region and therefore a more accurate estimate of solar access.

The image sensor may include circuitry capable of automatically adjusting the gain of the image sensor to accommodate outdoor light conditions. For example, if the sun is exposed in the field of view of the image sensor at the time the image is captured, the sensor gain may be automatically reduced to prevent saturation of the image sensor. Additionally, the image sensor lens may also have a filter that reduces the amount of light that hits the sensor array within the image sensor.

In another example, the skyline detector 202 may instead have two or more image sensors (i.e., two electronic cameras) each with narrow angle lenses instead of a single fisheye lens. In this example, each of the image sensors may produce an image and all images may be "stitched" together by software in the skyline detector 202. The resulting stitched image would be a wide horizontal angle image similar to an image produced with a single fisheye wide-angle lens. Therefore, this implementation example allows the use of standard lens in the skyline detector 202 instead of a special purpose fisheye lens. Additionally, the use of two or more images in this example may produce a resultant image with a wider angle field of view than the standard fisheye lens. As an example, if the skyline detector 202 includes two 100 degree FOV image sensors and the first image sensor is oriented such that one points 50 degrees off the center of the SAMD 200 and the other image sensor is pointed 50 degrees off the center in the opposite direction, the resulting combined image (or "stitched image") would have a FOV of 200 degrees, which is more than a typical fish-eye lens (which typically has 180 degree FOV).

In yet another example, the skyline detector 202 may include a single image sensor with a narrow angle lens, for example, 45 degree FOV lens. In this example, the skyline detector 202 (or image sensor) may be swept slowly across the skyline by the user or with an optional sweeping device (not shown) and the skyline detector 202 may capture multiple images while the SAMD 200 records the orientation of the skyline detector 202 each time an image is captured with, for example, an electronic compass and electronic inclinometer. The software in the skyline detector 202 then "stitches" the images together using the compass and level readings to form a larger wide-angle image. The optional output device 210 (such as an LCD display) may display a fixed wide-angle image centered to the south (if the SAMD 200 is located in the northern hemisphere) or in the northern direction (if the SAMD 200 is located in the southern hemisphere) that gets built up with each new image capture.

In yet another example, the skyline detector 202 may include a semispherical mirror utilized in conjunction with a narrow FOV lens and image sensor. In an example of operation, the mirror reflects a wide angle image of the skyline into the narrow FOV lens of the image sensor.

In yet another example, the skyline detector 202 may include a servo driven laser range finder instead of an image sensor and lens. The laser may be directed over a broad area of the sky pointing to all the locations where the sun will appear throughout the day and year. The laser range finder may include a reflection detector. The reflection detector detects when the laser is reflected by an object in the path of the laser. The SAMD 200 then keeps track of where objects were detected. A resulting open sky matrix may be generated by recording all orientations of the laser with no reflected light.

The processor ("the skyline processor") (not shown) in the skyline detector 202 may be any device capable of analyzing the images captured by the image sensor or reflections detected by the laser range finder and may be the same as the processor 206. In general, the skyline processor analyzes the captured images to locate the skyline where the novel techniques described below may be utilized for locating the skyline in the captured image. Generally, these techniques produce a set of pixels that describe where in the image the open sky is and where in the image the obstructions are.

For example, the image pixels of the captured image may be scanned column by column. An intensity derivative function may be performed on the image pixels by starting at the top of a column and moving pixel by pixel down the column. Since the sky is much brighter than the obstacles below the skyline, the intensity derivative will be largest between the pixel just above the skyline and the pixel just below. The coordinates between these pixels in the image plane may be stored as the location of the skyline in that column. More reliable performance may be achieved by averaging groups of pixels and using the groups to locate the skyline. The process may then be repeated for every column. By starting from the top of each column, the process is more likely to succeed since open sky will generally fill the top of the image. An estimate of the RGB (red, green, blue) color or luminosity of the sky may be established by scanning a predetermined area of the sky, for example the top 20% of the image, and averaging the pixels. This area is more likely to be open sky. This value may then be utilized to determine, for example, if the first pixel or group of pixels in a column is already below the skyline.

Alternatively, a two dimensional derivative may also be utilized in which the intensity derivative is calculated along each row as well as clown each column. The result is a two-dimensional derivative gradient from which the normal direction of the skyline may be calculated along the skyline. An edge detection scheme may then be utilized to locate the gradient peak. A reference intensity/color may be established, as described above, and used to select a threshold for doing the edge detection.

The orientation determination unit 204 is a device capable of determining the orientation of the SAMD 200 (or the skyline detector 202). The orientation determination unit 204 may include a compass (not shown) and an inclinometer (not shown) both of which may be either mechanical or electronic. The orientation determination unit 204 may also include a GPS unit or may be in signal communication with optional GPS sensor 224. It is appreciated by those skilled in the art that orientation may include a three-dimensional pointing direction and/or attitude of a device, such as the device's pointing direction relative to the magnetic orientation within a plane that is perpendicular to the Earth's gravitation vector. Additionally, orientation may also include the pointing direction of the device in both elevation, azimuth, and two-dimension pitch relative to a level position where the level position may be defined as being within the plane that is perpendicular to the Earth's gravitational field.

As an example, the orientation determination unit 204 may include a mechanical compass such as a needle in fluid that rotates to point in the direction of magnetic north. In this example, the SAMD 200 (or a user of the SAMD 200) points the lens of the skyline detector 202 towards true south (in the northern hemisphere) or true north (in the southern hemisphere) utilizing the magnetic compass and predetermined knowledge of the magnetic declination in that region. Alternatively, the lens of the skyline detector 202 is pointed toward magnetic south (in the northern hemisphere) or magnetic north (in the southern hemisphere) by using the magnetic compass and the user inputs, into the SAMD 200, the magnetic declination for the region and the skyline processor makes the appropriate correction to the orientation of the captured image digitally. The SAMD 200 may include a table of magnetic declinations for different regions and the user would enter the region into the SAMD 200 and the SAMD 200 would determine and correct for the magnetic declination.

In another example, the orientation determination unit 204 may include an electronic compass. In this example, the pointing direction need not be precisely controlled by the user. The user points the lens of the skyline detector 202 within a designated window, or tolerance, around true south (in the northern hemisphere) or true north (in the southern hemisphere). For example, the tolerance is +/−10 degrees from the desired pointing direction. In this example, the SAMD 200 would measure the actual pointing direction using the electronic compass at the time the image is captured. Then the processor 206 would digitally correct for any deviation from tote south (in northern hemisphere) or true north (in southern hemisphere) taking into account magnetic declination. Correction may be accomplished, for example, by transforming a digital image matrix by a correction amount or transforming a sun path matrix where the digital image matrix and sun path matrix are described below.

The orientation determination unit 204 may include a mechanical dual axis inclinometer such as a bubble level, which is a bubble inside a fluid that is centered in a small circle when the bubble level is laying level in both axis directions in this example, the user would hold the SAMD 200 horizontally and vertically level when the image is captured.

In another example, the orientation determination unit 204 may include an electronic inclinometer. In this example, the skyline detector 202 need not be held precisely level by the user. The user holds the SAMD 200 level to within a designated window, or tolerance, around 0 degrees of tilt in both directions such as, for example, +/−10 degrees from 0 degrees of tilt. In this implementation example, orientation determination unit 204 measures the actual dual axis tilt angles at the time the image is captured. Then the processor 206 digitally corrects for any deviation from 0 degrees. Again, the correction may be accomplished, for example, by transforming the digital image matrix by the correction amount or transforming the sun path matrix.

In another example, the orientation determination unit 204 may include at least two gyroscopic or accelerometer sensors. In this example, an initial orientation reference may be made by orienting the SAMD 200 at a known reference orientation and direction with known azimuth and elevation relative to the SAMD 200, such as level and toward magnetic south. Any relative motion of the SAMD 200 with respect to the reference orientation may be sensed by the gyroscopic sensors. As a result, the azimuth and elevation pointing direction of the skyline detector 202 may be determined as it is moved. In another example, the known reference is the current location of the sun. Based on the current time of day, day of year, latitude, and either longitude or the timezone for the location of the SAMD 200, the azimuth and altitude of the sun is determined. The sun is located in the image plane of the image sensor in the skyline detector 202. This serves as the known reference.

It is appreciated by those skilled in the art that the orientation determination unit 204 may be an external and/or internal device to the SAMD 200. Additionally, orientation measurement devices such as compasses, inclinometers, accelerometers, gyroscopes, or similar measurement sensors may also be internal or external to the orientation determination unit 204. As an example, a user my utilize external orientation measurement sensors or predetermined knowledge of orientation data to manually orient the orientation determination unit 204, skyline detector 202, and/or SAMD 200 or to manually input the user orientation information to the orientation determination unit 204, skyline detector 202, and/or SAMD 200.

Generally, a latitude where the data is being collected by the SAMD 200 is needed. The latitude is preferably accurate to within, for example, +/−0.5 degrees, but may also be within a wider range, for example, +/−3 degrees. Small errors in latitude result in small errors in the estimated solar access. Alternatively, a user may enter the region of the world where the data is being collected, for example, northern California, and the SAMD 200 may determine the latitude from a table of regions in memory. This is done once when the SAMD 200 is first set up and does not need to be done again as long as the user remains in the same latitude band. Software in the processor 206 analyzes the detected skyline and based on the latitude, magnetic orientation (from compass), and inclination (from inclinometer), accurately predicts the sun's travel through the sky throughout the day and throughout the year. The captured skyline and open sky are then overlaid on top of the cumulative region of the sky through which the sun will pass (the "sun paths") and the software may accurately predict when in the day and year shadows will occur in the spot where the data was taken.

Compass and inclination feedback may be given to the users as they are preparing to capture the image. Then once the image is captured, in the case of an electronic compass and electronic inclinometer, the actual compass and inclination readings are used to make minor corrections to the captured image or sun paths in the case that the image sensor is not held facing directly south (in the northern hemisphere) and/or perfectly level. The user may need to orient the image sensor to within a designated window. This designated window is determined by how much correction may be made to the captured image or sun paths in this example, the skyline image is matched up with the predicted paths of the sun. Additional corrections for magnetic declination may be made for the particular region where the magnetic declination is the deviation of true north from magnetic north.

The optional output device 210 may be any device capable of displaying and/or outputting data related to the solar access of the SAMD 200. As an example, the optional output device 210 may be an image display device. The optional input device 211 may be any device capable of allowing a user or external device (not shown) to manually or mechanically input external information about the location, orientation, and/or position of the SAMD 200. As an example, the optional input device 211 may be a touchscreen or keypad. The memory 208 may be any type of storage device or memory that is capable or storing data or software for the processor 206 such as, for example, random access memory ("RAM"), read only memory ("ROM"), cache memory, or hard drive. The optional communication bus 212 is any device capable of allowing the SAMD 200 to electronically communicate information and/or data to a storage device (not shown) external to the SAMD 200.

Figure 3:
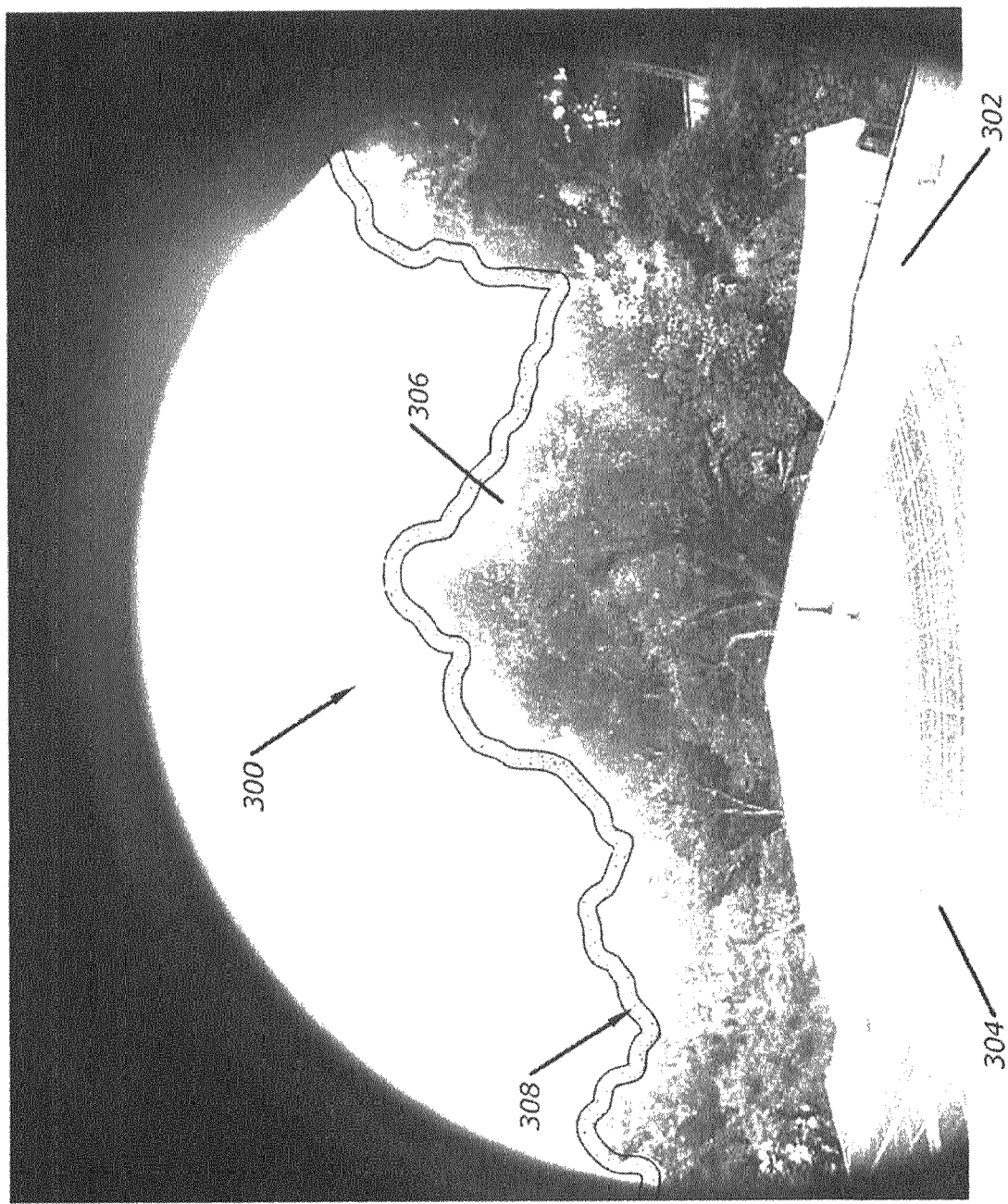
FIG. 3 is an example of a wide angle image captured with the skyline detector of the SAMD shown in FIG. 2.

FIG. 3 is an example of a wide angle image 300 captured with the skyline detector 202 of the SAMD 200. As an example, the wide angle image 300 may include a roof 302 of a structure (not shown), solar panels 304, trees 306, and skyline 308. In order for the processor 206 to calculate the sun paths and overlay them on the wide angle image 300, the skyline detector 202 is first calibrated.

Figure 4:
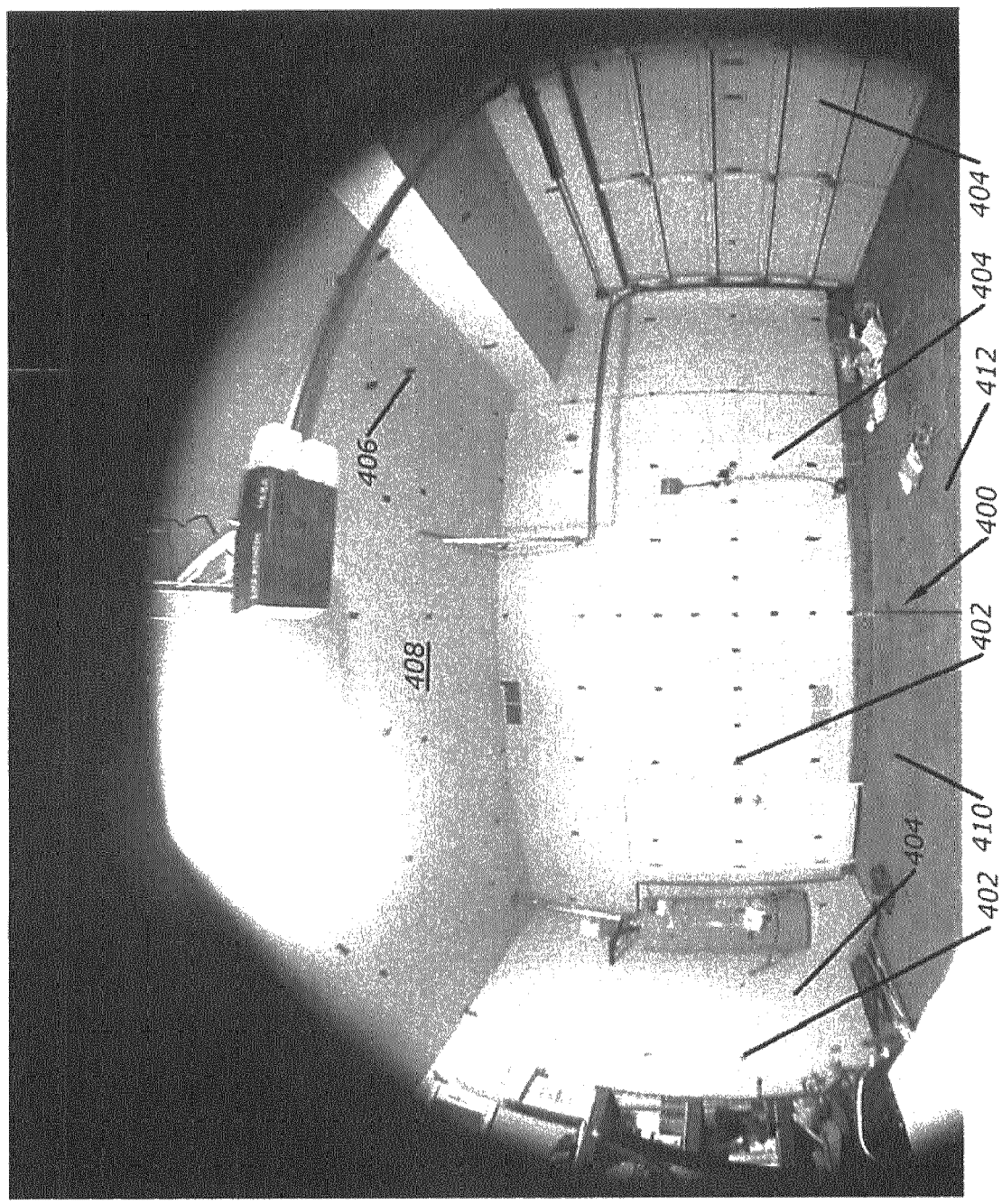
FIG. 4 shows an example of a calibration image captured by the skyline detector of FIG. 2.

The skyline detector 202 may be calibrated by capturing an image 400 of objects that have known azimuth and elevation angles relative to the SAMD 200 as shown in FIG. 4. These known elevations can be established, for example, with a calibrated transit level or other device capable of accurately measuring the elevation and azimuth of one location relative to another. As an example the skyline detector 202 may be calibrated by first making wall marks 402 on the walls 404, ceiling marks 406 on the ceiling 408 and floor marks 410 on the floor 412 of a predefined room. Each mark may be labeled and spaced at regular intervals of elevation and azimuth angles. Then an image 400 may be captured with the SAMD 200 of the walls, ceiling and floor within the predefined room.

The image 400 may then be analyzed by the processor 206 or manually by the user and each known calibration point within the image 400 (i.e., each wall mark 402, ceiling mark 406, and floor mark 410) may be associated with a pixel in the image 400 that falls in the center of the calibration point. Then an interpolation may be performed by the processor 206 to fill in the areas in between the calibration points, and an extrapolation may be performed to extend beyond the calibration points at the edges of the image. The result is a calibrated image plane in which the azimuth and elevation angles of every pixel in the calibrated image relative to the orientation of the SAMD 200 is known. Alternatively, the skyline detector 202 may be calibrated by mathematically modeling the optics of the lens and image plane such that the angular relationship between each pixel in the image plane is known and the angular relationship between each pixel and the enclosure of the SAMD 200 is known.

In an example of operation, the SAMD 200 may utilize a calibration/verification technique using the sun's location in the image plane as detected by the skyline detector 202. Generally, the location of the sun at any given time, date, and latitude is known from planetary motion. The sun's location may be determined from the captured image in the skyline detector 202 combined with the compass and inclinometer readings from the orientation determination unit 204. If a time and date are also maintained in the SAMD 200 by a timing device (not shown), there would be redundant known data variables, i.e., latitude, time, date, and sun location. It is appreciated by those skilled in the art that generally any one of these variables could be deduced from the other three.

Figure 5:
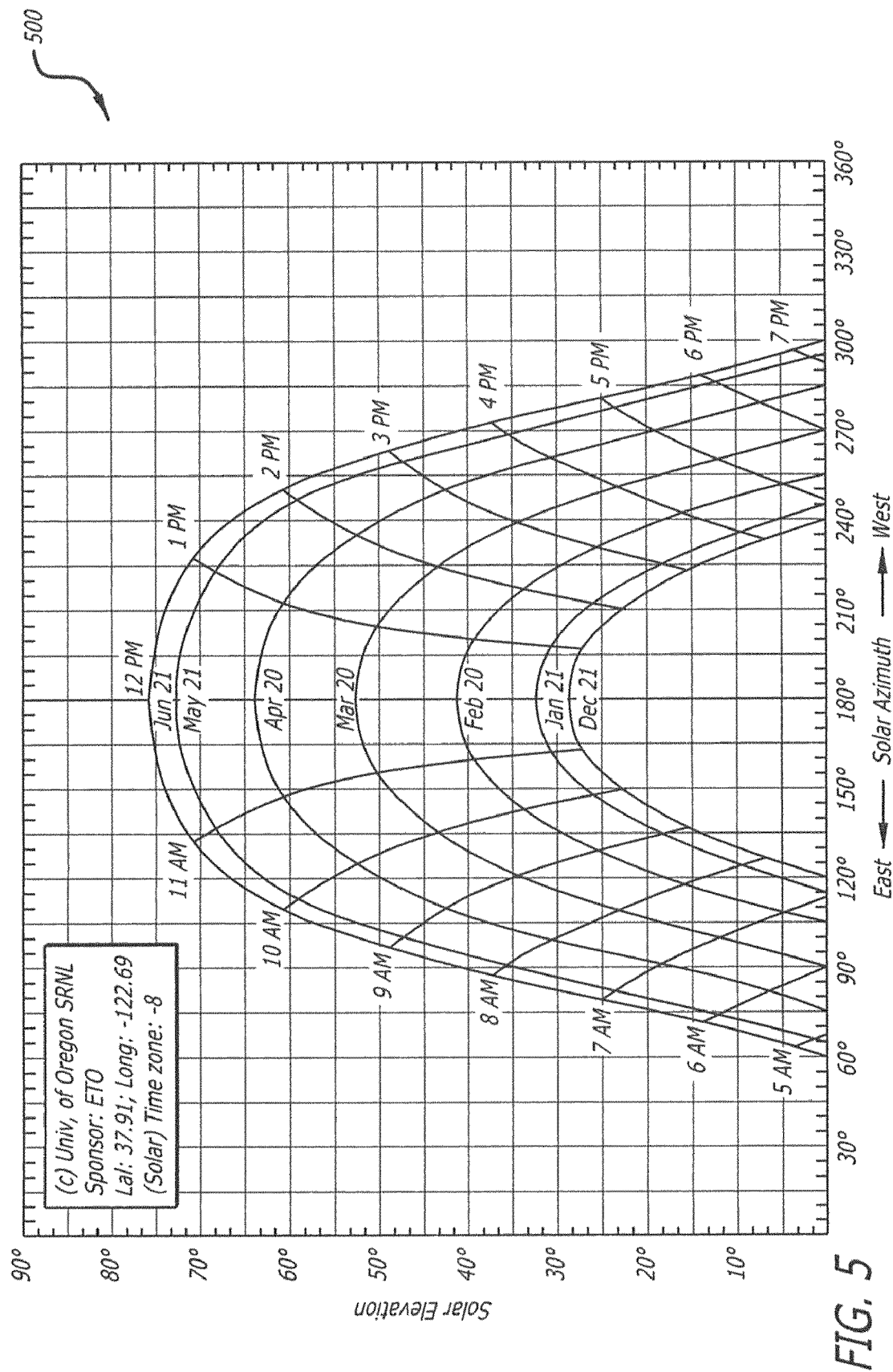
FIG. 5 shows an example of sun paths.
Figure 6:
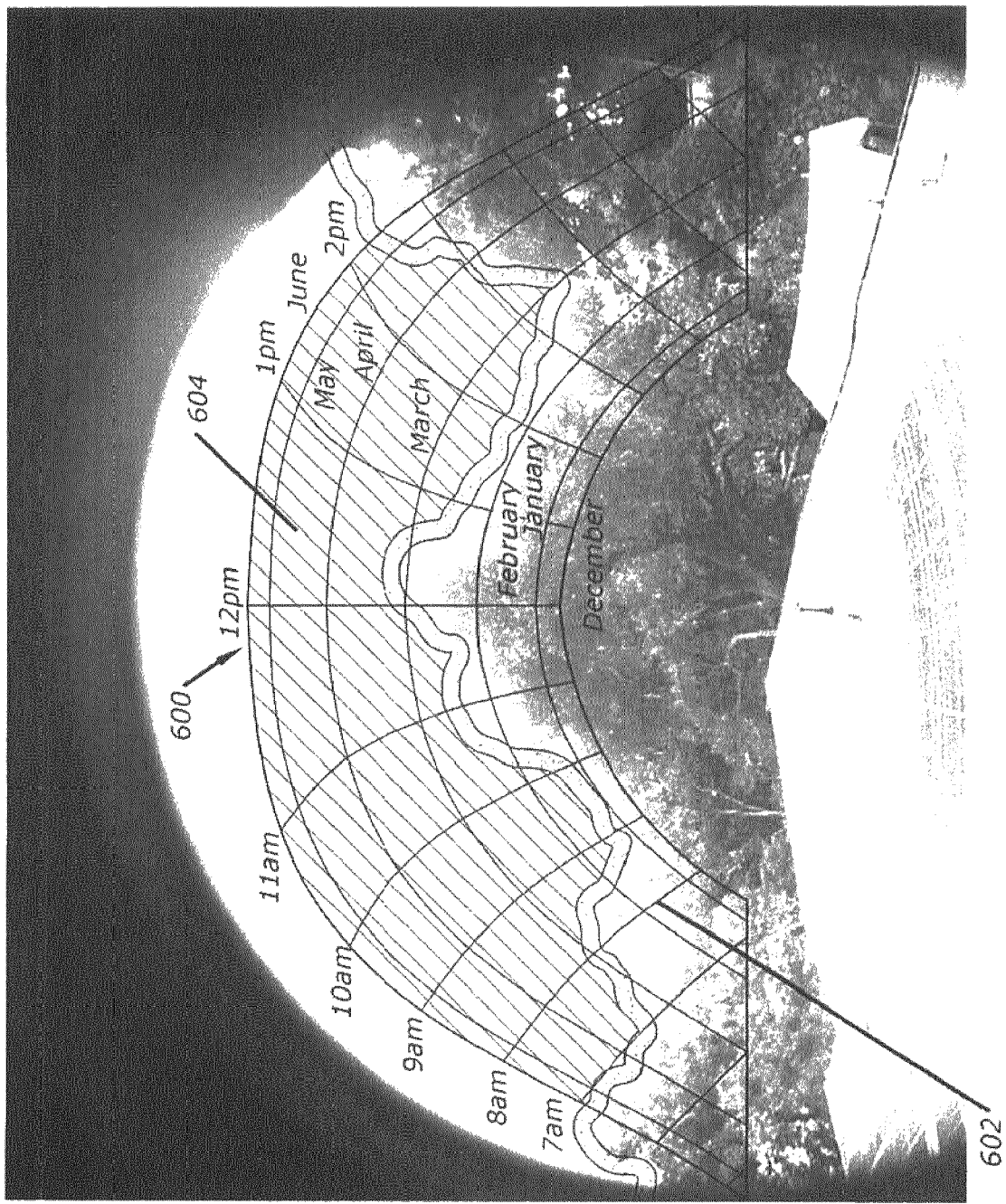
FIG. 6 shows an example of a superimposed sun path and skyline image generated by the SAMD of FIG. 2

It is further appreciated that the location of the sun in the sky may be calculated from latitude on earth, time of day and day of year from equations well known in the field of astronomy. As an example, by calculating the location of the sun every, for example, 30 minutes, through an entire day, a sun path may be determined for that day. By calculating the sun paths for every day of the year, a sun band can be determined. This band includes all locations of the sun throughout the clay and throughout the year. The band may then be mapped into a matrix that represents where in the image the sun paths would appear. An example of a plot 500 showing all sun paths is shown in FIG. 5. In FIG. 6, an example of a skyline image 600 with sun path grid lines 602 superimposed on the captured image 300 of FIG. 3 is shown. The area 604 of the sun paths that is in open sky is shaded (as denoted by crosshatching). From this shaded region 604 the total solar energy that will impinge the location of the SAMD 200 may be calculated.

In an example of operation, once the open sky matrix has been identified and the sun paths matrix has been calculated, the two matrices may be analyzed by the processor 206 to generate a third matrix representing the intersection of the open sky and the sun band. The intersection matrix corresponds with the shaded area 604 in FIG. 6. In general, the "open sky matrix," "sun paths matrix," and "intersection matrix" are each two-dimensional binary arrays indexed by elevation and azimuth. A '0' in a cell of the open sky matrix indicates that the sun is blocked (i.e., below the skyline) at that elevation and azimuth. A '1' indicates that the sun is not blocked and is therefore part of the open sky. A '0' in a cell of the sun paths matrix indicates that the sun is never at that elevation and azimuth at any time during the year. A '1' indicates that at some time and day the sun is at that elevation and azimuth and is therefore part of the sun paths. The intersection matrix is the logical AND of the open sky and sun paths matrices. This intersection matrix is further analyzed to determine all times of day and days of year when the sun is in open sky that is not obstructed from view at the location of the device by some obstacle. A fourth two-dimensional matrix called the "solar access matrix" can be generated by calculating the solar radiation of the sun for every elevation and azimuth corresponding to a '1' in the intersection matrix. The solar radiation is based on the solar constant (approximately 1367 W/m$^2$) and the angle of the sun relative to the angle of the collector panel. The above steps of detecting the skyline, mapping the sun paths, and calculating the solar access for any given time period may be performed quickly or even "instantaneously", that is, the steps all occur in simply the amount of time required for the electronics and processors to operate. The SAMD 200 does not need to be left out in the sun for an extended period of time. In general, the sun does not even need to be present in order for the SAMD 200 to measure the solar access of the location. Modifications may be made to the data to account for tree leaf loss. For example, evergreen trees do not loose their leaves and so will cast the same shadows year round. Deciduous trees may be identified by the user and can be treated differently by the processor 206. For example, if the data was collected during a season when the tree has little or no leaves, the processor 206 can assume shading during the leaf bearing months of the year. If the data was collected during a season when the tree has most or all of its leaves the processor 206 can assume less shading during the months when the tree will loose its leaves.

The solar access matrix is a set of data that may be formatted in many different ways. For example, it may be integrated across time of day and day of year to get a single number that is the cumulative annual sun exposure in W*h/m$^2$ for the particular location. This could then be converted to a Kilowatt-hour (KWhr) number representing the predicted electrical energy generation of a particular solar panel configuration size, and technology (e.g., Crystalline Silicon, Amorphous Silicon "Thin film", etc). Or it may be converted to a dollar amount if Net Metering and/or Time-of-Use metering is used to interconnect with the utility. Further, more detailed, representations of the data may be made. For example: a bar chart of solar radiation in each month of the year, a recommended direction in which to move the panels to improve production, a recommended tilt angle for the panels, or a suggestion of obstacles to remove to improve solar exposure (the obstacle may be identified in the skyline image and if it's a tree, it could be trimmed). A database of average temperatures for the region may be used in the calculation of the power generated by the panels because panels produce different amounts depending on their temperature.

It is appreciated by those skilled in the art that some of the energy coming from the sun is lost due to passing through the atmosphere and clouds. The software in the processor 206 may correct for these effects with the clearness index ("KT") for the given location. A database of KT values for different locations is obtained by measuring solar radiation continuously over time and recording the average solar energy year for year. This annual solar radiation data is available from groups such as NREL (National Renewable Energy Laboratory) and may be incorporated in the memory (not shown) of the processor 206.

Figure 7:
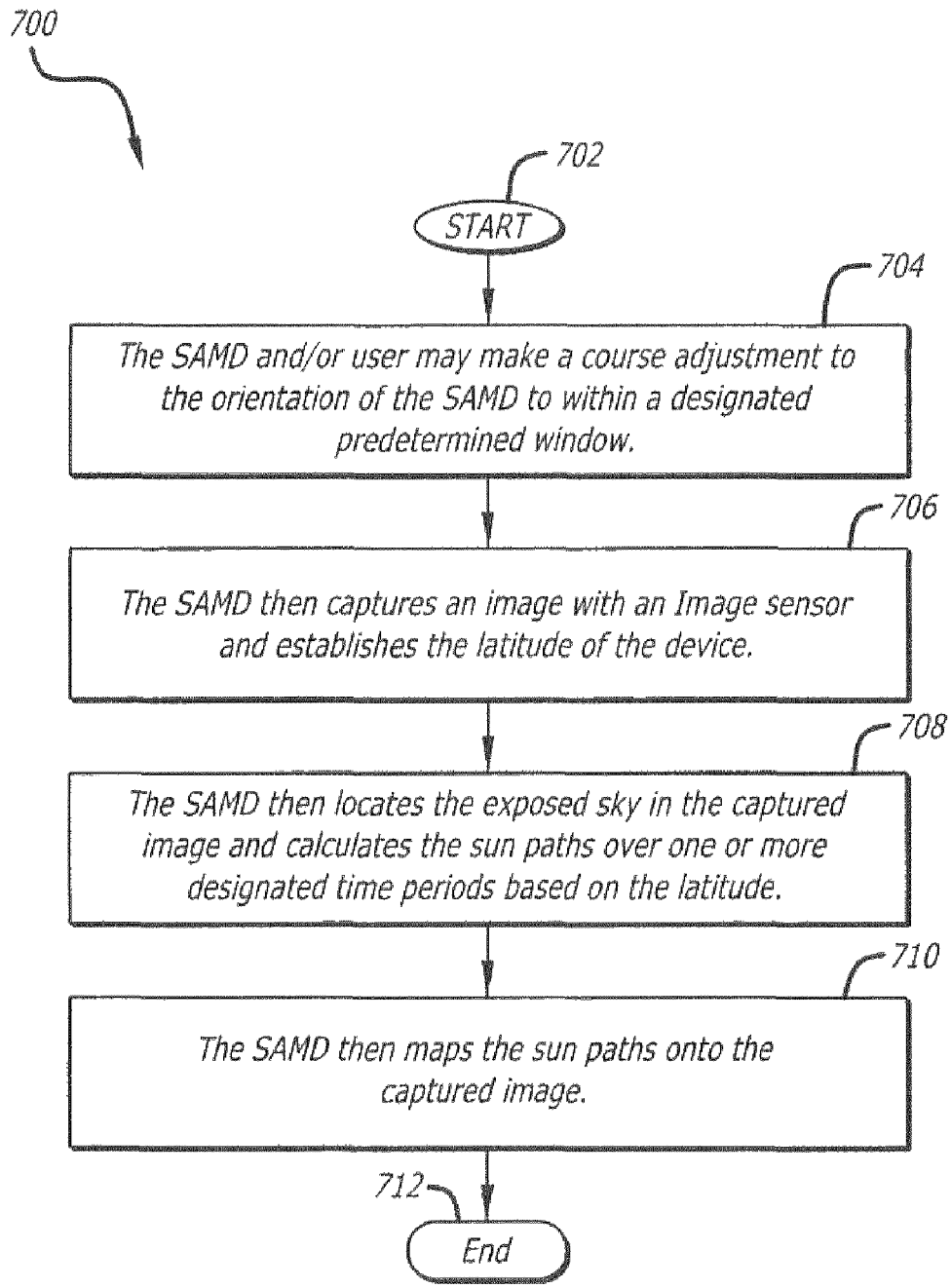
FIG. 7 shows a flowchart of an example of operation of the SAMD shown in FIG. 2.

In operation, the SAMD 200 determines the solar access of a location of the SAMD 200 based on a digital image taken by the SAME) 200. As an example of operation, the SAMD 200 may perform the process described by the flowchart 700 of FIG. 7. The process begins in step 702 and in step 704, the user may make a course adjustment to the orientation of the SAMD 200 to within a designated window. The SAMD 200 then captures an image with an image sensor and establishes the latitude of the device in step 706. The SAMD 200 then locates the exposed sky in the captured image and calculates the sun paths over one or more designated time periods based on the latitude in step 708. Next, in step 710, the SAMD 200 maps the sun paths onto the captured image. The process then ends in step 712.

The process may also further include the steps of calibrating the image plane of the image sensor of the SAMD 200 prior to making a course adjustment to the orientation of the SAMD 200; identifying where the exposed sky and the sun paths overlap; and calculating the amount of solar energy that reaches the location of the SAMD 200. The image plane may be calibrated by associating each pixel or group of pixels with the azimuth and elevation angles of the light vector passing through the lens of the image sensor and hitting the pixel or group of pixels relative to the orientation of the SAMD 200.

The course adjustment to the orientation of the SAMD 200 may be an adjustment in magnetic orientation and in inclination relative to the earth's gravity. The designated window may be centered on the vector pointing towards magnetic south (in the northern hemisphere) or north (in the southern hemisphere) and perpendicular to the earth's gravitational field.

Location of the skyline in the captured image may be done by image processing in the processor 206 or an external processor (not shown) in signal communication via the optional communication bus 212. Generally, light areas in the top of the image are assumed to be open sky and the boundary between the light sky and the dark earth-bound objects is the skyline. The intersection may be found using an intensity derivative along columns of pixels.

As an example, the orientation of the SAMD 200 may be established simultaneously with capturing the image. The orientation of the SAMD 200 is the magnetic orientation of the SAMD 200 and the dual axis inclination of the SAMD 200. As an implementation example, the magnetic orientation may be measured using an electronic compass, and the inclination is measured using an electronic dual axis inclinometer.

The SAMD 200 may implement a method in which matrices are used to manipulate the data. The image captured by the image sensor can be thought of as a matrix of pixels. The pixel (i, j) is the pixel in the i$^{th}$ row and j$^{th}$ column of the image plane. A calibration step associates each pixel or groups of pixels with the elevation and azimuth angles of the light ray passing through the image sensor lens and hitting the pixel or group of pixels. The result is the image plane calibration matrix, $IMAGE_{cal} = (\theta_c, \phi_c)_{i=1 \ldots C, j=1 \ldots R}$. $(\theta_c, \phi_c)_{ij}$ is an elevation and azimuth angle pair defining a vector relative to the three degree orientation of the SAMD 200 $O = (\Theta, \Phi, \Gamma)_{device}$, where $\Theta$ is the elevation offset angle defined as the angle of deviation of the pointing direction of the SAMD 200 from the plane that is normal to the direction of the earth's gravitational field vector (i.e., deviation from level front to back). $\Phi$ is the azimuth offset angle defined as the angle of deviation of the pointing direction of the SAMD 200 from magnetic south (in the northern hemisphere) or north (in the southern hemisphere) where rotation is about the axis that is equivalent to the earth's gravitational field vector. $\Gamma$ is the horizon offset angle defined as the deviation about the axis of the pointing direction of the SAMD 200 of the plane of the SAMD 200 from the plane that is normal to the direction of the earth's gravitational field vector (i.e., deviation from level side to side). The calibration is made for each pixel by iterating for i=1 to R and j=1 to C, where R is the total number of rows, and C the total number of columns, in the image plane. Alternatively, groups of pixels are calibrated.

Next a course adjustment is made by the user to the orientation vector O of the SAMD 200 to within a designated window around (0,0,0). (0,0,0) represents a known orientation, for example due south, and level relative to the earth's gravitational field along two axes. Next an image is captured.

As an example, the designated window may be wide, for example, +/−10 degrees. In this example, simultaneously with capturing the image, the actual orientation may be measured, for example, with an electronic compass and electronic inclinometer. In another example, a mechanical compass and bubble level may be used by the user to orient the SAMD 200 within the designated window and the designated window may be narrow, for example, +/−2 degrees in all axes. In this case, deviation in orientation from (0,0,0) results in error in the outcome of estimate of solar radiation. Alternatively, only the compass is electronic and the inclinometer is mechanical or only the inclinometer is electronic and the compass is mechanical. In either of these cases, the axis measured by the electronic sensor may have a wide designated window.

Next, the current image plane azimuth/elevation matrix, $IMAGE = (\theta, \phi)_{i=1 \ldots C, j=1 \ldots R}$, is calculated from the calibration matrix, $IMAGE_{cal}$, and the orientation vector of the SAMD 200, O. $(\theta, \phi)_{ij}$ is the elevation and azimuth angles relative to the vector that is pointing south (in the northern hemisphere) or north (in the southern hemisphere) and normal to the gravitational field vector (i.e., level). IMAGE is calculated by transforming the $IMAGE_{cal}$ matrix by the orientation O. For example, if the O=(1, −2, 0), then $IMAGE = (\theta, \phi)_{ij} = (\theta_c, \phi_c)_{ij} - (1, -2)$.

Next the captured image is mapped to the image plane azimuth/elevation matrix IMAGE by associating $pixel_{ij}$ in the image with $(\theta, \phi)_{ij}$. Then the exposed sky is located within the captured image as described earlier. Then the located skyline is used to define a subset SKY of matrix IMAGE consisting of all pixels representing exposed sky.

Next the latitude of the SAMD 200 is entered by the user, or alternatively it may be measured with an optional GPS sensor 224. The sun paths are calculated throughout the day and year. The sun paths are then mapped onto the matrix IMAGE, defining a subset SUN of the matrix IMAGE that represents locations of the sun within the image plane throughout the day and year.

Next a matrix EXPOSURE is defined and calculated as the intersection of the matrices SUN and SKY. A weighed integration of the matrix EXPOSURE across rows and columns is performed to obtain the total solar energy that hits the location. Weighting may be, for example, based on solar intensity for elevation and azimuth, average weather patterns, clearness index (KT), orientation of exposed surface, etc.

In one example of operation, a system installer maps out an area quickly by taking multiple samples in different locations. The SAMD 200 may instantly calculate the total power generation for each location on, for example, a roof-top or ground site and then records the GPS coordinates if an optional GPS sensor 224 is utilized in the SAMD 200. The software then interpolates in between the data points to predict solar exposure in areas between the sample locations. The software may then show the "hottest" area of the proposed system (i.e., the area with the greatest solar access). The software may also show where the shadows will mostly fall and may suggest, for example, the optimal configuration of the panels of a solar collection system.

Interpolation and extrapolation of solar access in between and beyond a sparse set of samples is done by the processor 206, which records the elevation and azimuth angles of each distinctive obstruction that makes up the skyline. By locating the same obstacle in images from different perspectives, the software may utilize triangulation to get distances to obstructions. Then shadowing in between and beyond sample locations may be predicted.

Figure 8:
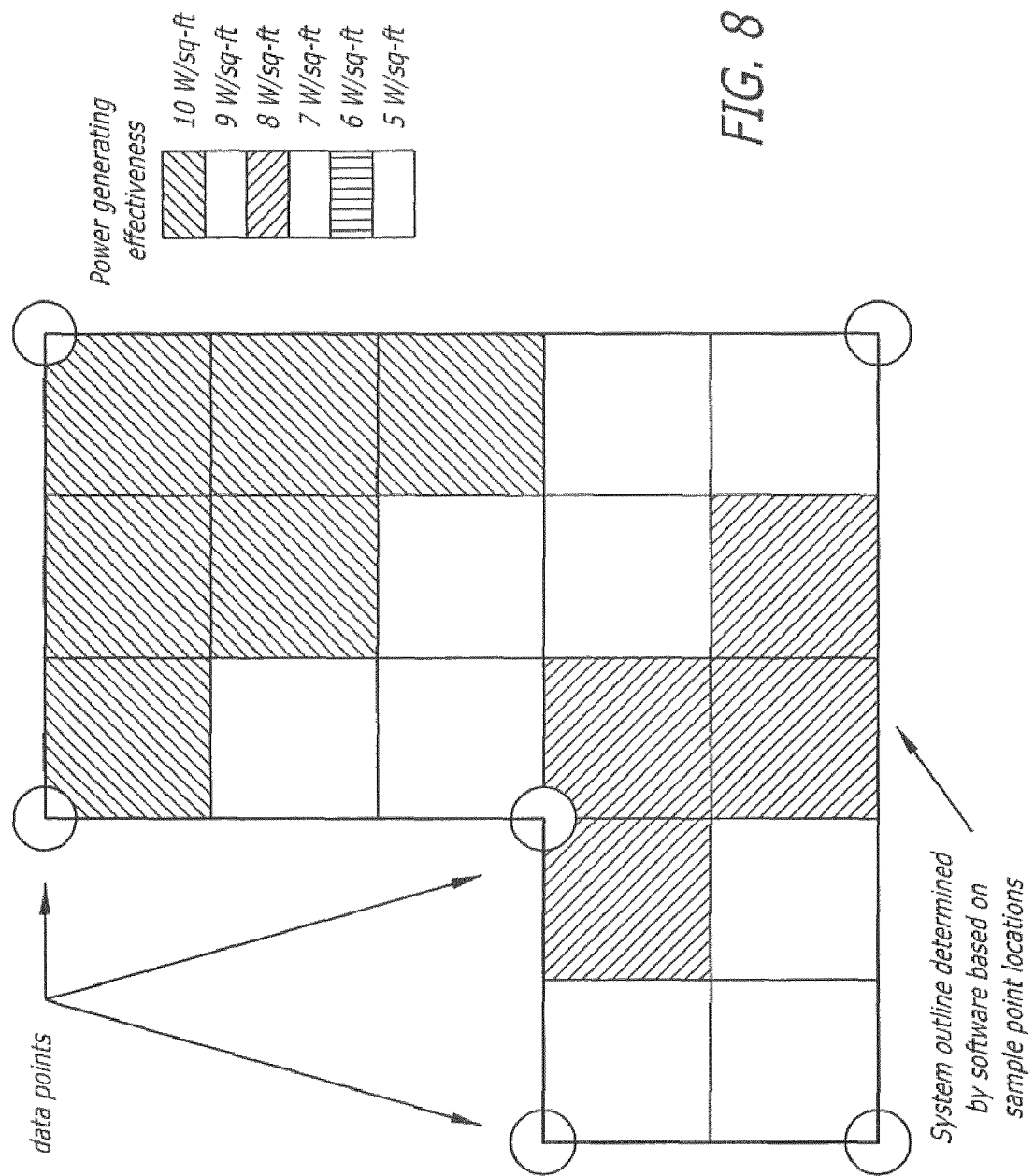
FIG. 8 shows an example of a "hot-spot" diagram generated by the SAMD of FIG. 2.

An example of what the display might show after 6 sample points have been taken indicating the six vertices of the proposed system layout is shown in FIG. 8 where each data point is generated by the process described above (i.e., detecting the skyline, calculating the total solar energy, etc). Alternatively, the user may take samples on a rough grid across the roof or area of the proposed installation, and the software may show the optimal location for the solar panels.

As another example, the SAMD 200 may map a potential installation area with a boundary and show the potential solar radiation as described above, but without the optional GPS sensor 224. In this example, a starting reference point may first be established and a reading taken. Then a user may pace in a direction, incrementing a counter via a four-way joystick type button in the direction the user is pacing with each pace. Then another sample may be taken. Next the user paces in another direction. The SAMD 200 may then keep track of the approximate position of the SAMD 200 utilizing dead-reckoning. The pace distance may be "calibrated" by the user measuring the approximate length of a pace and entering it into the SAMD 200 with the optional input device 211. Alternatively, the X-Y distance from the reference to each point may be measured (such as with a measuring tape) and entered into the SAMD 200. Alternatively, the SAMD 200 may include a dual axis accelerometer or gyroscopic sensor (not shown) that allows the SAMD 200 to utilize dead-reckoning (after a reference location is first established) based on integrating the gyroscopic or accelerometer readings to track the movement of the SAMD 200 and determine the location of the SAMD 200 relative to the reference location.

In another example of operation, the calibrated image plane may be used as an electronic transit level. A transit level may be utilized in construction to determine the azimuth and elevation angle of something or somewhere in a construction site. The user looks through an eye piece and positions the cross hairs on the point of interest then azimuth and elevation can be read off. Alternatively the user moves an object until it reaches a desired azimuth or elevation be setting the transit level to the desired angles and moving the object until it comes in view in the eye piece. The SAMD 200 may be utilized in a similar fashion by capturing an image of the scene. The user may then query the azimuth or elevation angle of a point in the image by clicking on it or in some other way telling the software which pixel corresponds to the location of interest, and the SAMD 200 reports back the angles. Alternatively, the desired angles are entered into the SAMD 200 and a box or cross hair appears in the image at the location entered. The user then moves the object until it is inside the box or on the cross hairs in the image. In this example, the SAMD 200 captures a new image each time the object is moved.

In yet another example of operation, the SAMD 200 may be used to position satellite antennas. When directing an antenna at a geosynchronous satellite, it is desirable to have the dish both point in the direction of the satellite and avoid obstructions between the dish and the satellite. In this example, the SAMD 200 may include a skyline detector 202, compass and inclinometer, and a database of azimuth and elevation angles of all known satellites. The skyline detector may locate the skyline in the direction of the satellite and the SAME) 200 may determine the intersection of any obstacles with the line of site between the dish and the satellite. As a result, the SAMD 200 may provide a figure of merit to the user for a particular desired location of the dish and suggest a direction in which to move the dish. Alternatively, the optional output device 210 (such as image display) may show an image of the skyline and superimposed on the image the optional output device 210 may show the location of the satellite. The user may then see in the optional output device 210 where the satellite is being obstructed. Because many home owners prefer satellite dishes to be out of view, it is often necessary to balance between strong signal reception and aesthetics and the SAMD 200 may help optimize this tradeoff.

In another example of operation, the SAMD 200 may include software and/or a database of plants and their preferred light conditions. Different plants and trees grow best with different amounts of daily, monthly, or yearly sunlight. In this example, the SAMD 200 may be utilized by landscapers and landscape architects to choose the plants and trees for a location in a garden or yard. The amount of sun that hits a particular location is dramatically affected by the shading characteristics of that location. The SAMD 200 may measure the amount of sun access at a location taking into account shading and suggest plants that would grow best.

In another example of operation, the SAMD 200 may be interfaced to a three-dimensional computer-aided design ("3D CAD") software system. The solar access data may be integrated with the CAD drawings for a new house or building. The user may then simulate how sunlight will interact with the new structure. For example if there is a large tree in front of the house, it may be determined if that tree will block morning sun in the winter. Then the house design may be modified if different lighting is desired. This is also useful for architects integrating passive solar design aspects into the house. In this design methodology, solar heating of floors, walls, etc is considered in the building design to optimize heating the house in the winter and cooling the house in the summer. Again the combined solar radiation data in the 3D CAD model may be used to modify the design to optimize different aspects of the structures interaction with the sun.

In another example of operation, the SAMD 200 may measure ambient light (as opposed to just direct sunlight). This is useful for planning new construction in which it is desirable to optimize natural lighting inside the building. The skyline is captured and the open sky is identified. The amount of ambient light is measured by integrating over the open sky region. In the planning of a new building in, for example, a crowded urban site, it may be desirable to know the ambient light exposure that would be received at different levels of a new building. Hence, if an interpolation/extrapolation scheme is used to fill in exposure data in between data points, as an example, this may be done in three dimensions as opposed to two dimensions as described earlier. The third dimension will be in the elevation direction to give data for different floor levels of the new building.

In another example of operation, the SAMD 200 may include a processor operable to identify windows in a captured image take from inside a house. The SAMD 200 may then calculate the amount of sun that enters through the window. This SAMD 200 may be used by realtors showing a house to a potential buyer that is interested in how much sun enters the house and at what time of day and year.

Persons skilled in the art will understand and appreciate, that one or more processes, sub-processes, or process steps described may be performed by hardware and/or software. Additionally, the process described above may be implemented completely in software that would be executed within a microprocessor, general-purpose processor, combination of processors, digital signal processor ("DSP"), and/or application specific integrated circuit ("ASIC"). If the process is performed by software, the software may reside in software memory in the memory 208, processor 206, skyline detector 202 processor, an external processor (not shown) in signal communication with the optional communication bus 212, or combination. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium", and/or "computer-readable medium" is any means that may contain, store, communicate, propagate, or transport the program for use by or in connection with the instruction execution system, apparatus, or device. The computer-readable medium may selectively be, for example but not limited to, an electronic, magnetic, optical, electromagnetic, infrared, or semiconductor system, apparatus, or device. More specific examples, but nonetheless a non-exhaustive list, of computer-readable media would include the following: an electrical connection (electronic) having one or more wires; a portable computer diskette (magnetic); a random access memory ("RAM") (electronic); a read-only memory ("ROM") (electronic); an erasable programmable read-only memory ("EPROM" or Flash memory) (electronic); an optical fiber (optical); and a portable compact disc read-only memory ("CDROM") (optical).

It will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:
1. An apparatus, comprising:
an image sensor enabled to capture an image of a horizon;

an orientation determination unit enabled to establish at least one of a magnetic orientation and an inclination of a captured image of the horizon, within a designated window; and a processor in signal communication with the image sensor and the orientation determination unit, enabled to determine solar access based on a skyline within the captured image of the horizon, an established at least one of the magnetic orientation and the inclination of the captured image of the horizon, and a provided location whereat the image of the horizon is captured.

2. The apparatus of claim 1 wherein the image sensor includes a wide-angle lens that enables the image sensor to capture the image of the horizon within a single digital image.

3. The apparatus of claim 1 wherein the captured image results from reflecting a wide-angle image including the skyline onto a narrow field-of-view lens of the image sensor.

4. The apparatus of claim 3 wherein the skyline includes a line where solar obstacles and the sky meet within the horizon.

5. The apparatus of claim 1 wherein the processor includes software enabled to analyze a captured image of the horizon to detect the skyline within the horizon.

6. The apparatus of claim 1 wherein determining the solar access includes representing on an output device at least one of an amount of solar radiation that will impinge the provided location, and one or more paths of the sun throughout a range of times of day and days of a year for the provided location, superimposed on at least one of the captured image of the horizon and the skyline.

7. The apparatus of claim 1 wherein the orientation determination unit includes at least one of an electronic compass, an electronic inclinometer, an accelerometer, and a gyroscope.

8. The apparatus of claim 7 wherein the processor includes software enabled to analyze the captured image of the horizon to detect the skyline within the horizon.

9. The apparatus of claim 2 wherein the processor is in signal communication with at least one of a Global Positioning System ("GPS") device enabled to establish the provided location, and an input device enabled to receive an input to the processor to establish the provided location.

10. An apparatus, comprising:
an image sensor enabled to capture a wide-angle image of a horizon that includes a skyline;
an orientation determination unit enabled to measure at least one of a magnetic orientation and an inclination of the image sensor; and
a processor in signal communication with the image sensor and the orientation determination unit, enabled to determine solar access based on detecting the skyline within the image of the horizon, a measured at least one of the magnetic orientation and the inclination, and a provided location whereat the image of the horizon is captured.

11. The apparatus of claim 10 wherein the processor is in signal communication with at least one of a GPS device enabled to establish the provided location, and an input device enabled to receive an input to the processor to establish the provided location.

12. An apparatus, comprising:
a skyline detector enabled to reflect a wide-angle image of a skyline onto a narrow field-of-view lens of an image sensor, the skyline including a boundary between unobstructed sky and one or more solar obstacles;
an orientation determination unit including at least one of a compass and a level, enabled to establish an orientation for the wide-angle image; and
a processor in signal communication with the image sensor, enabled to determine solar access based on the skyline and a provided location whereat the image of the horizon is captured.

13. The apparatus of claim 12 wherein the image sensor provides a digital image of the wide-angle image of the skyline reflected onto the narrow field-of-view lens of the image sensor.

14. The apparatus of claim 12 wherein the skyline includes a line where solar obstacles and the sky meet within the horizon.

15. The apparatus of claim 12 wherein the processor is in signal communication with at least one of a GPS device enabled to establish the provided location, and an input device enabled to receive an input to the processor to establish the provided location.

16. A non-transitory computer-readable medium with an executable computer program comprising an ordered listing of executable instructions stored thereon, wherein the computer program, when executed, instructs a processor to perform a method, the method comprising:
capturing an image of a horizon that includes a skyline;
measuring at least one of a magnetic orientation and an inclination of the captured image; and
determining solar access based on the skyline within the captured image, the measured at least one of the magnetic orientation and the inclination of the captured image, and a provided location whereat the image of the horizon is captured.

17. The non-transitory computer-readable medium of claim 16 further comprising establishing the provided location based on at least one of an acquired reading from a GPS device and a received input from an input device.

18. A non-transitory computer-readable medium with an executable computer program comprising an ordered listing of executable instructions stored thereon, wherein the computer program, when executed, instructs a processor to perform a method, the method comprising:
capturing a plurality of images of a horizon that includes a skyline;
recording orientation of two or more individual images in the plurality of captured images; and
determining solar access based on the skyline within the plurality of captured images of the horizon, the recorded orientation of the two or more individual images in the plurality of captured images, and a provided location whereat the image of the horizon is captured.

19. The non-transitory computer-readable medium of claim 18 further comprising combining two or more individual images in the plurality of captured images on an output device.

20. The non-transitory computer-readable medium of claim 18 wherein the plurality of images results from sweeping an image sensor across the horizon.

* * * * *